Figure 1:
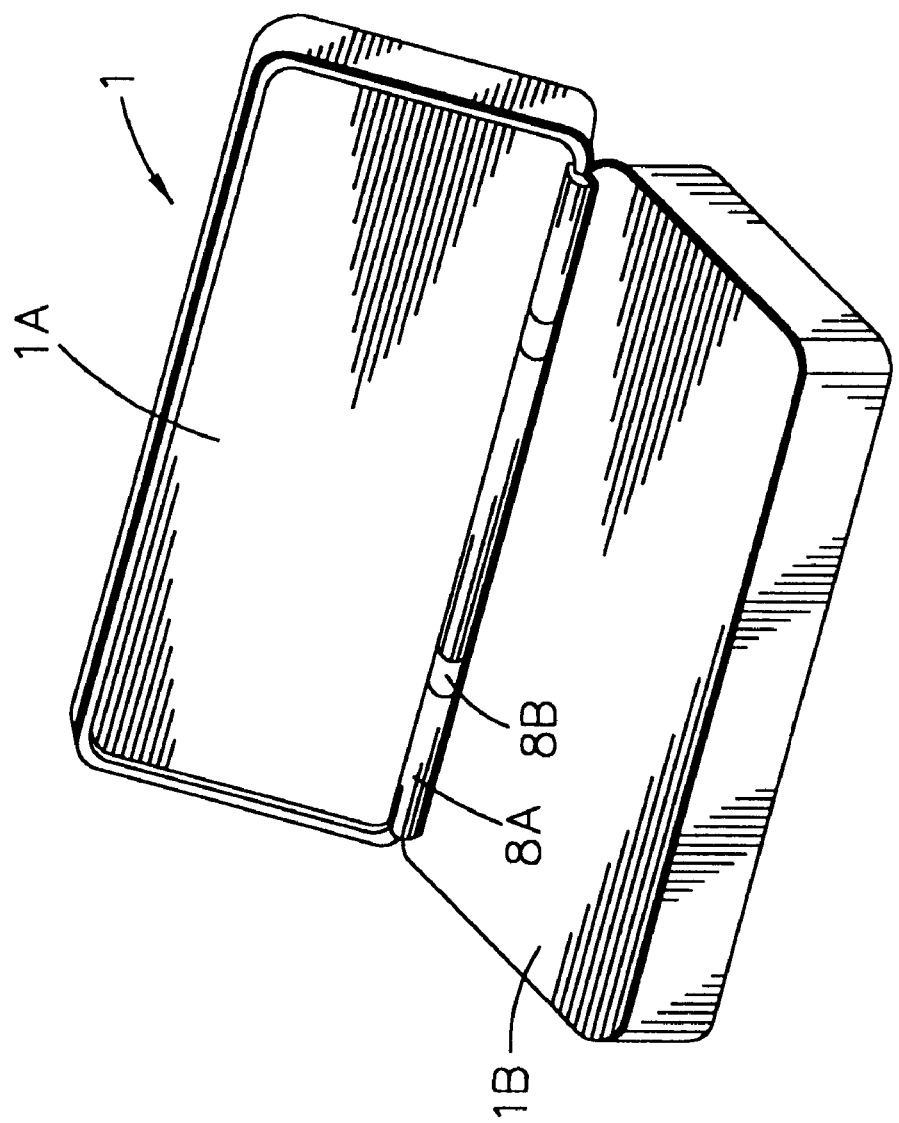

United States Patent

Repo

[11] Patent Number: 5,915,440
[45] Date of Patent: Jun. 29, 1999

[54] HINGE MECHANISM FOR A FOLDABLE APPARATUS

[75] Inventor: Markku Repo, Tampere, Finland

[73] Assignee: Nokia Mobile Phones Limited, Salo, Finland

[21] Appl. No.: 08/833,713

[22] Filed: Apr. 9, 1997

[30] Foreign Application Priority Data

Apr. 11, 1996 [FI] Finland ..................................... 961587

[51] Int. Cl.⁶ ............................ E05D 11/10; E05C 17/64
[52] U.S. Cl. ................................... 16/330; 16/303; 16/341
[58] Field of Search ..................... 16/330, 303, 328–331, 16/321, 322, 344, 304, 308, 307, 284, 285, 341, 342, 309, 314

[56] References Cited

U.S. PATENT DOCUMENTS

| | | | |
|---|---|---|---|
| 2,362,923 | 11/1944 | Pardoe | 16/303 |
| 4,957,264 | 9/1990 | Hakanen | 248/510 |
| 5,016,851 | 5/1991 | Koskinen et al. | 248/278 |
| 5,040,712 | 8/1991 | Pesonen et al. | 224/42.45 R |
| 5,121,863 | 6/1992 | Kotitalo et al. | 224/42.45 R |
| 5,168,982 | 12/1992 | Hakanen et al. | 200/342 |
| 5,189,698 | 2/1993 | Hakanen | 379/455 |
| 5,274,882 | 1/1994 | Persson | 16/303 |
| 5,398,378 | 3/1995 | Lin | 16/303 |
| 5,500,984 | 3/1996 | Lee | 16/309 |
| 5,597,102 | 1/1997 | Saarikko et al. | 224/197 |
| 5,697,124 | 12/1997 | Jung | 16/341 |
| 5,715,576 | 2/1998 | Liu | 16/341 |

FOREIGN PATENT DOCUMENTS

| | | |
|---|---|---|
| 0 422 882 A1 | 4/1991 | European Pat. Off. . |
| 0 535 912 A2 | 4/1993 | European Pat. Off. . |
| 0535912 A2 | 4/1993 | European Pat. Off. . |
| 364 243 | 3/1906 | France . |

Primary Examiner—Chuck Y. Mah
Attorney, Agent, or Firm—Perman & Green, LLP

[57] ABSTRACT

The invention relates to a hinge mechanism for a foldable device. The previously known devices of this type do not stay in the open position in the desired manner, but they either open too much or close too easily. The hinge mechanism according to the invention locks the device in the open position, from which it does not open further even by using more force. Closing takes place using little force, whereby the amount of the force required is easy to adjust by altering the shape of the hinge pins. The hinge pin is divided into two parts (10a, 10b). The first hinge pin (10a) is locked in axial transition to the first hinge lug (8a), and the second hinge pin (10b) is locked into the second lug (8b) correspondingly. One end surface of the hinge pin has ridges (12a, 12b), and the other end surface has corresponding slots (11a, 11b). In the open position of the device the ridges and slots are matching. The shape of the ridges and slots is such that the device cannot be opened beyond the open position and that a suitably small amount of force is required to close the device.

10 Claims, 5 Drawing Sheets

HINGE MECHANISM FOR A FOLDABLE APPARATUS

The invention relates to a hinge mechanism according to the preamble of claim 1.

A hinge mechanism like this is used particularly in mobile phones and different electronic manual devices. For the operation of the devices, the two parts of the device must be turned to the open position, in which position the parts are at a predetermined angle towards one another. The device stays in the open position by means of the slots and ridges of the hinge. It is desirable that the device is stable in the open position when it is used and does not close too easily. In order to close the device, a force is to be exerted on the folding part, and the exerted force must be stronger than the spring force of the hinge. With regard to ease of operation of the device, the force should be neither too strong nor too weak.

A hinge mechanism is known from the patent specification EP-535 912, in which the force required to open and to close the device is adjusted at different strengths depending on whether the device is being opened or closed. When the device is opened, it is settled at a certain predetermined angle in which the slots and ridges of the hinge mechanism meet one another. From this position, the device can be opened to a larger angle and folded to a closed position. A stronger force is needed to open the device further than to close it. The strength of the force needed is adjusted by means of the shape of the slots and ridges formed in the hinge lug and the locking piece that is in contact with it by means of a spring. The angles of the inclined sides of the slot and ridge, which have a trapezoidal cross-section, are applied such that in the direction of rotation of the folding movement the pulling angle is wider than in the direction of rotation of the opening movement. Thus a stronger force is required to overcome the spring force to open the device further than to close it. The relative strength of the forces needed is adjusted by means of the angles. In this known construction, the opening angle can be widened by using more force. However, this implies an obvious risk that extra force exerted on the device on purpose or by accident may result in excessive opening and breaking of the device.

The object of this invention is to achieve a hinge mechanism which is locked to a predetermined opening angle and cannot be opened beyond that point. Another object of the invention is to achieve a hinge mechanism the rigidity of which can be adjusted by simple measures.

The above objects have been implemented by a hinge mechanism according to the invention, which is mainly characterized in that the hinge pin is divided into two parts, the first of which is form-locked in axial transition to the first hinge lug, and the second is form-locked in axial transition to the second hinge lug, that one of the end surfaces of each hinge pin has slots and the other end surface has ridges of similar shape, that the slots and ridges in the opposite end surfaces of the hinge pins forced into contact to one another by the spring are intended to fit to one another at the predetermined opening angle, and that the common contact surface of the slot and the ridge settled within it, which in the direction of rotation of the opening movement of the hinge mechanism is the side that comes behind and operates as the pushing side, is essentially perpendicular towards the end surface of the hinge pin in order to stop the opening movement, while the opposite common contact surface forms an angle smaller than 90° with the end surface of the hinge pin.

With this construction, the opening movement of the device stops at a predetermined opening angle, and the opening angle cannot be widened further. In the open position, the two parts of the foldable device are prevented from moving outward in relation to one another. The folding of the parts takes place with a relatively weak force which is determined in advance. This ensures easy and safe operation of the device.

Figure 2:
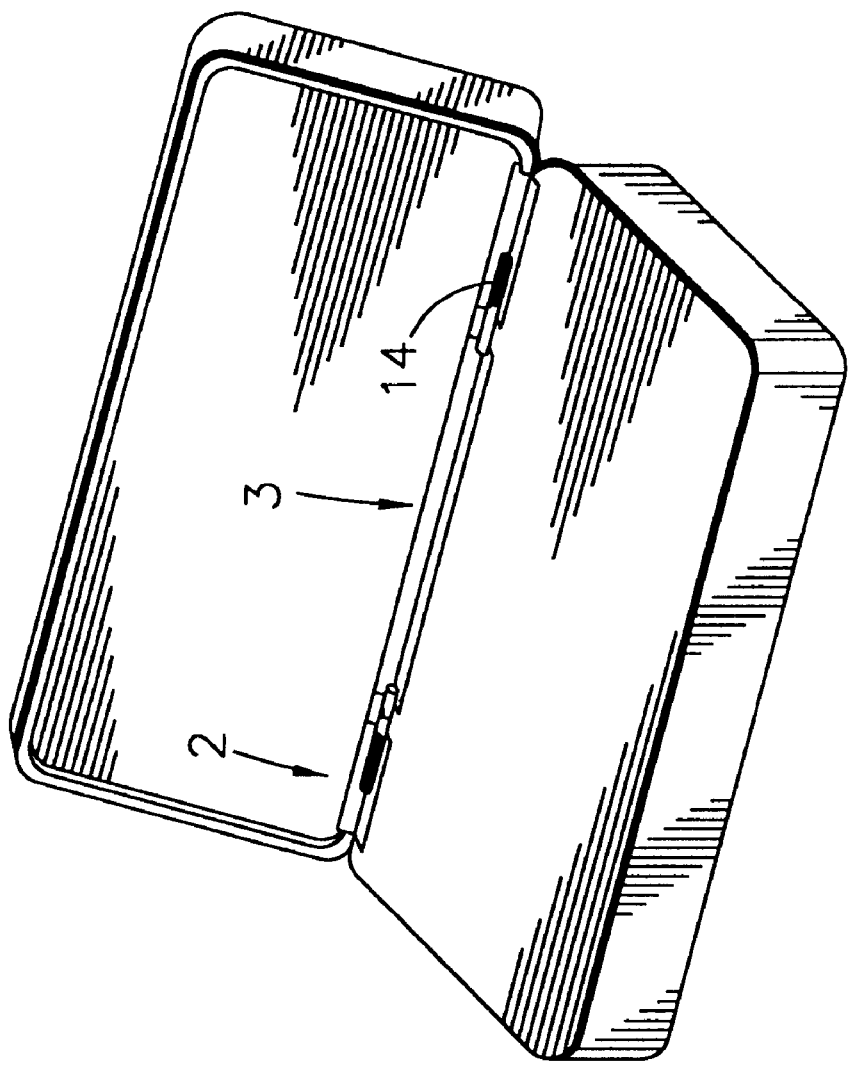
Figure 3:
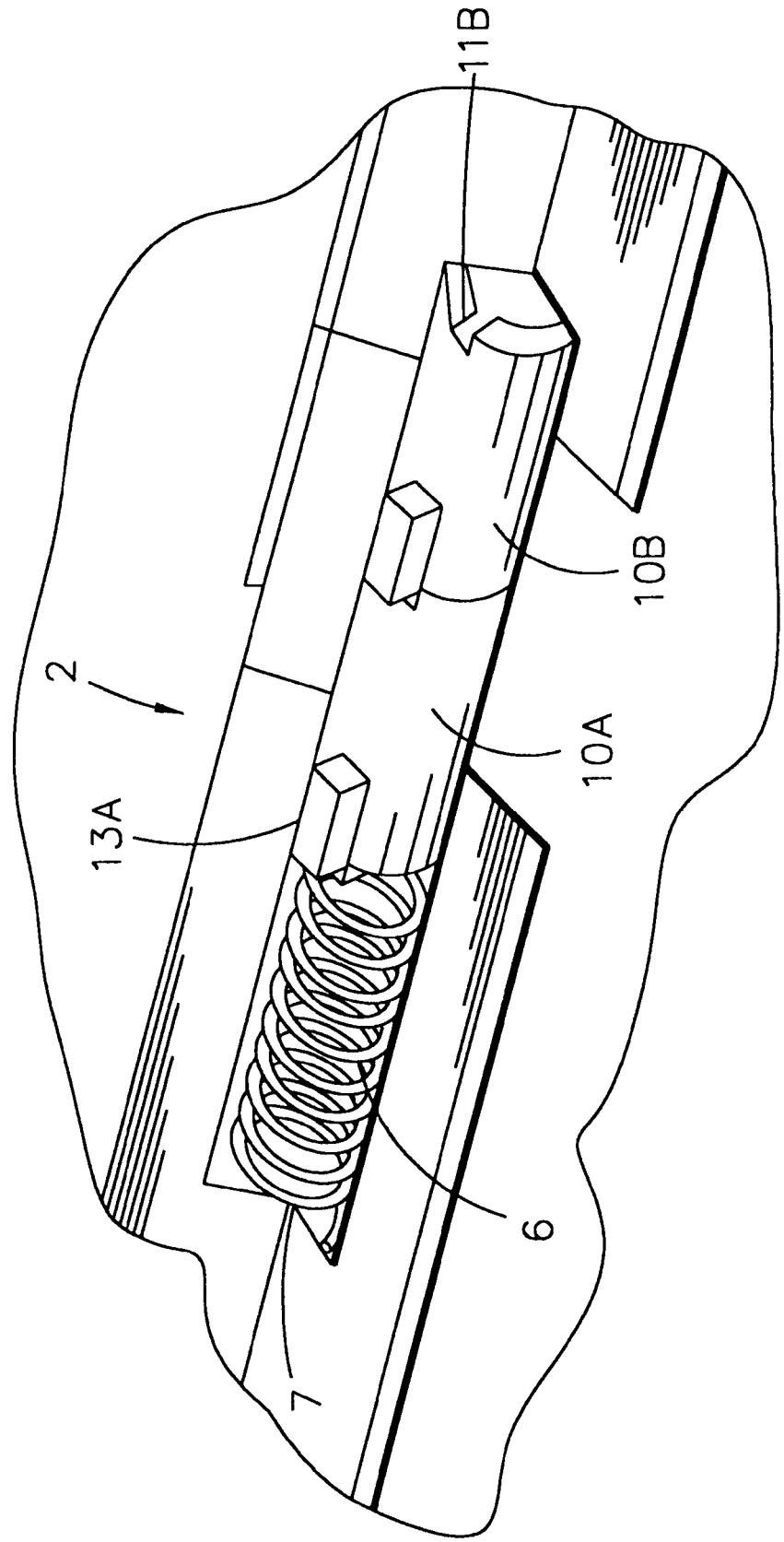
Figure 4:
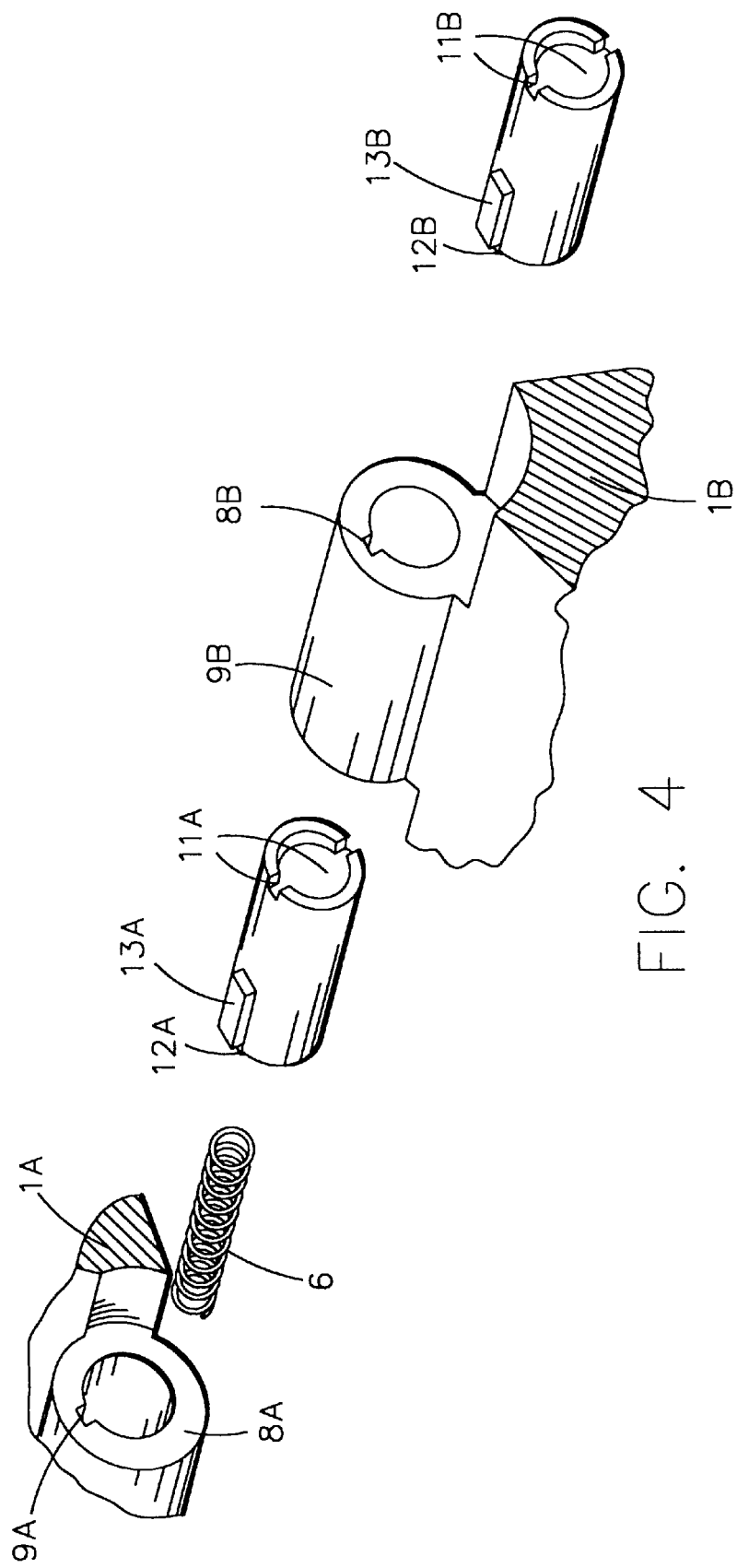
Figure 5:
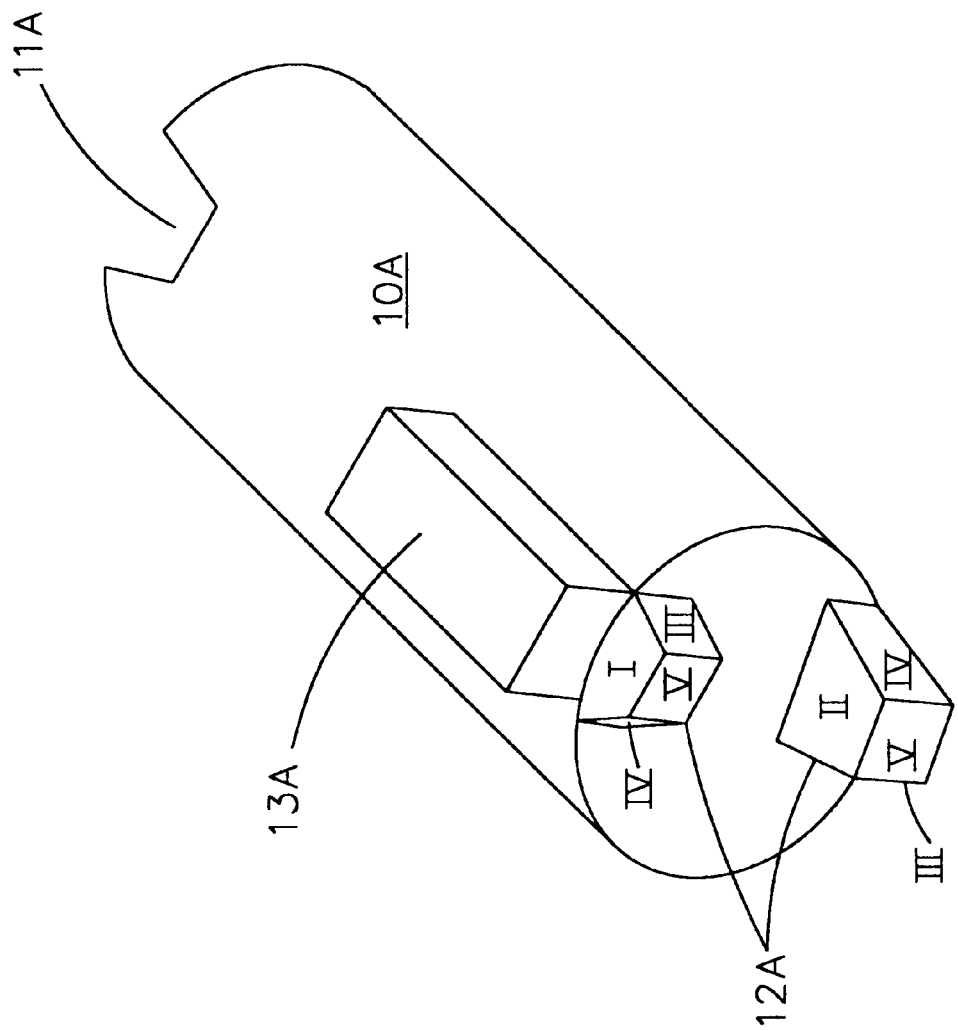

In the following, the preferred embodiment of the invention will be described in more detail with reference to the appended drawings, in which FIG. 1 shows the foldable device with its hinge mechanism as a perspective drawing, FIG. 2 shows the same as FIG. 1 but the hinge mechanism opened, without the hinge lugs, FIG. 3 shows an enlargement of the two hinge pins of the hinge mechanism and the spring forcing them as a perspective drawing, FIG. 4 shows an enlarged, exploded view of the mechanism according to the invention with its hinge lugs, springs and hinge pins, and FIG. 5 shows an enlargement of the hinge pin as a perspective drawing.

FIG. 1 shows a foldable electronic device 1, which has two casings 1a and 1b. The hinging of the device is shown as a complete, closed construction.

In FIG. 2 the hinge mechanism is shown as revealed without the hinge lugs and barrels. As seen from the front, the left hinge mechanism 2 is a mechanism according to the invention. The right hinge mechanism 3 is of conventional construction, and it is not described in more detail.

FIG. 3 shows the essential parts of the hinge mechanism 2 according to the invention as applied to the joint structure of the casings. The hinge pins 10a and 10b are applied to the hinge opening 7 as forced by the spring 6. The figure shows the open position, in which the slots and ridges in the opposite end surfaces of the hinge pins are matching.

FIG. 4 shows the casings 1a and 1b of the device 1 and the hinge lugs 8a and 8b that are fastened to them as immobile. Axial slots 9a and 9b have been formed on the inner surface of the hinge lugs, in the position of the figure on the upper surface thereof, for form-locking the hinge pins to them so that the pins can move in relation to the lugs in the axial direction, but are immobile in relation to them in the direction of rotation.

The hinge pins 10a and 10b are identical. Slots 11a and 11b are formed on one end surface thereof, and ridges 12a and 12b on the other end surface, see also FIG. 5. The ridges 12a are trapezoidal pieces and are located in the edge zone of the end surface of the hinge pin. The outer side I of the trapezoid forms an extension of the envelope surface of the pin 10a; the opposite wall II is mainly parallel with the previous; the side wall III between them, which as seen from the front and clockwise is the side wall that moves ahead, is rectangular towards the end wall of the pin and the opposite side wall IV is inclined towards the end wall of the pin; the upper wall V is rectangular and parallel with the end wall. When the device is opened and closed, the upper walls V of the ridge 12a run along the end wall of the adjacent hinge pin, until they in the open position hit the slots 11a in the end wall.

The slots 11a on the second end wall are of corresponding shape. The outer wall of the hinge pin has an axial protruding part 13a, 13b, which has a similar cross-section as the slot 9a of the hinge lug.

The opening and closing of the device 1 shown in the figures takes place as follows, see also FIGS. 3 and 4. The hinge lugs 8a and 8b are fastened as immobile to the casings 1a and 1b. The location of the slot 9a, 9b in the inner wall is precisely determined in advance, because the open position or the opening angle of the device is determined by the positions of the slots 9a and 9b in relation to one another. The spring 6 is fitted in the hinge lug 8a, in the hinge opening 7, and the hinge pin 10a is slipped into the lug after the spring so that the protruding part 13a of the pin is in the slot 9a of the lug. The hinge pin 10b is slipped into the hinge lug 8b, the protruding part 13b in the slot 9b of the lug. The hinge lugs 8a and 8b are adjacent according to the FIG. 1. An ordinary hinge pin, forced by the spring 14, FIG. 2, operates on the other side of the hinge pin 10b. The adjacent end surfaces of the hinge pins 10a and 10b with their slots 11a and ridges 12b are in contact with one another as forced by the springs 6 and 14.

The position of the casings 1a and 1b shown in FIG. 4 is the open position of the device, in which the opening angle is predetermined and over 90°. The angle position of the hinge pins 10a and 10b is the same, that is, the slots 11a and the ridges 12b are matching. The same situation is shown as solid view in FIG. 3.

The fact that the opening angle cannot be increased from this even by exerting more force becomes clear from the following: in order to increase the opening angle, the part 1a should turn clockwise in relation to the part 1b, or the common pushing contact surfaces III of the hinge pin 10a and the hinge pin 10b should detach the slots and ridges from one another against the effective spring force. Because the surfaces III are at a 90° angle towards the end surface, such a force in the direction of the axis of the hinge pin is not generated as to detach the slots and ridges from one another and thus to allow the hinge pins to rotate in relation to one another towards a wider opening angle.

in order to fold the device, the part 1a must rotate counterclockwise, whereby the sides IV operate as the common, pushing contact surfaces. Together with the end level these surfaces form an angle which is smaller than 90°, whereby pushing one part 1a towards the other 1b generates a force in the direction of the axis of the hinge pin, which force pushes the slots and ridges away from one another, and enables the winding of the hinge pins and the hinge lugs into one another.

The angle between the sides IV and the end level determines the strength of the force that is required to close the device; the smaller the angle the smaller the force required. In practice, the angle is between 80° and 40°, preferably between 70° and 60°. It appears from the above that the size of the angle is not critical, but it must be smaller than 90°.

The hinge pins are preferably of the same shape also with regard to the length and the form and location of the protruding part 13a, 13b. This is an advantage with regard to manufacturing techniques. The end surfaces of the hinge pins preferably have two slots and ridges, which are diagonally opposite. However, the hinge mechanism also operates with only one slot and ridge or with two non-diagonal slots and ridges.

The hinge pins are preferably manufactured by injection moulding from thermoplast, such as Nylon or POM. They can also be manufactured from a zinc die-cast alloy.

The size of the opening angle is adjusted by the location of the slots 9a, 9b of the hinge lugs 8a, 8b in relation to one another. FIG. 4 shows the position of the slots when the opening angle is over 90°. If the opening angle is to be increased, the slot 9a must be moved counter-clockwise on the surface of the hinge lug 8a, or the slot 9b must be moved clockwise on the surface of the hinge lug 8b.

It is a considerable advantage of the hinge mechanism according to the invention that in order to implement the adjusting measures, there is no need to change the shape of the casings 1a and 1b and their casting moulds, but the changes can be implemented by means of the shape of the hinge pins, which is much more economical in the light of manufacturing techniques.

I claim:

1. A hinge mechanism (2) for fastening two different parts (1a, 1b) of a foldable device (1) to one another rotatable in first and second rotational directions to one another so as to enable the opening and closing of the device, which mechanism comprises a first hinge lug (6a) fastened as immobile to the first part of the device (1a) and a second hinge lug (8b) fastened as immobile to the second part of the device (1b), which hinge lugs are applied so as to settle coaxially in succession, and within which hinge lugs there is a hinge pin (10a, 10b) and a spring (6) that forces the hinge pin characterized in that the hinge pin is divided into two parts (10a, 10b), the first (10a) of which is correspondingly shaped in part to fit within a substantially axially oriented formed shape in the first hinge lug (8a) and the second hinge pin part (10b) is correspondingly shaped in part to fit within a substantially axially oriented formed shape in the second hinge lug (8b), that there are slots (11a, 11b) in one end surface of each hinge pin part, and ridges (12a, 12b) of similar shape on the other end surface, such that the slots in one hinge part are forced into contact with the ridges of the other hinge part at corresponding contact surfaces by the spring (6) when said hinge parts are rotated relative to one another at a certain predetermined opening angle of the device, and that the corresponding contact surfaces (III) of the slot (11a, 11b) and the ridge (12a, 12b) are defined by different portions of each of said slots and said ridges depending upon which direction of rotation, such that in the opening movement of the hinge mechanism (2) in said one rotational direction, the one of said contact surfaces trailing in the direction of rotation is essentially rectangular and acts against the corresponding contact surface of the other hinge pin part in order to stop the opening movement of the device, while the corresponding contact surfaces defined by portions of each of said slots and said ridges trailing the rotational direction of closing (IV) in said second direction forming a given angle smaller than 90 degrees with the end surface of each hinge pin part, whereby the device is capable of being folded on itself by the relative rotation of said two different parts.

2. A hinge mechanism according to claim 1, characterized in that the given angle is between 80 degrees and 40 degrees.

3. A hinge mechanism according to claim 1, characterized in that the first hinge pin part (10a) and the second hinge pin part (10b) are of similar shape.

4. A hinge mechanism according to claim 1, characterized in that each hinge lug (8a, 8b) includes an axial slot (9a, 9b) formed on the inner surface of the hinge lug and each hinge pin parts includes an extruding portion (13a, 13b) of corresponding shape on the outer surface of the hinge pin part.

5. A hinge mechanism according to claim 4, characterized in that the opening angle of the device is adjusted by changing the angle position of the axial slot (9a, 9b) in each of said first and second hinge lugs.

6. A hinge mechanism according to claim 1, characterized in that the ridges (12a, 12b) on the end surface of each pin part (10a, 10b) are formed by two similar trapezoids, one vertical side (I) of which forms an extension of the surface of the hinge pin, and another vertical side (III) at an angle towards said vertical side, said another vertical side is the trailing side or the pushing side in the direction of rotation of the opening movement of the hinge mechanism, and is essentially rectangular towards the end surface of the hinge pin part.

7. A hinge mechanism according to claim 6, characterized in that the two trapezoids (12*a*, 12*b*) on the end surface of the hinge pin part and corresponding two trapezoidal slots (11*a*, 11*b*) on the other end surface are located diametrically opposite to one another.

8. A hinge mechanism according to claim 1, characterized in that each of said hinge pin parts (10*a*, 10*b*) is manufactured by injection moulding.

9. A hinge mechanism according to claim 8, characterized in that each of said hinge pin parts (10*a*, 10*b*) is manufactured from a thermoplastic material.

10. A foldable device, such as a mobile phone, characterized in that two hinges are provided as part of said hinge mechanism and one of the hinges is a hinge mechanism (2) as described in claim 1, and the other hinge is a combination of hinge lugs, hinge pin (3) forced into contact with said hinge lugs by a spring.

* * * * *